US012066777B2

(12) United States Patent
Saeki

(10) Patent No.: US 12,066,777 B2
(45) Date of Patent: Aug. 20, 2024

(54) FIXING DEVICE

(71) Applicant: TOSHIBA TEC KABUSHIKI KAISHA, Tokyo (JP)

(72) Inventor: Ryota Saeki, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/080,475

(22) Filed: Dec. 13, 2022

(65) Prior Publication Data

US 2023/0359140 A1 Nov. 9, 2023

(30) Foreign Application Priority Data

May 6, 2022 (JP) ................................. 2022-076611

(51) Int. Cl.
*G03G 15/20* (2006.01)

(52) U.S. Cl.
CPC ..... *G03G 15/2039* (2013.01); *G03G 15/2053* (2013.01)

(58) Field of Classification Search
CPC ....................... G03G 15/2053; G03G 15/2039
See application file for complete search history.

(56) References Cited

U.S. PATENT DOCUMENTS 5,592,276 A 1/1997 Ohtsuka
6,246,035 B1 6/2001 Okuda
2014/0138372 A1* 5/2014 Ogura ................ G03G 15/2042 399/329
2017/0102650 A1* 4/2017 Shimura .................. H05B 3/03
2018/0032008 A1* 2/2018 Sako .................. G03G 15/2042
2019/0204765 A1 7/2019 Morimoto
2020/0103796 A1 4/2020 Furuichi
2021/0364958 A1 11/2021 Someya
2022/0035286 A1 2/2022 Saeki

FOREIGN PATENT DOCUMENTS

EP 0996040 A2 4/2000
JP H10247027 A 9/1998
JP 2000010435 A 1/2000
JP 2008152957 A 7/2008

OTHER PUBLICATIONS

Extended European Search Report dated Sep. 22, 2023, mailed in counterpart European Application No. 23157089.6, 9 pages.

* cited by examiner

*Primary Examiner* — Sevan A Aydin
(74) *Attorney, Agent, or Firm* — Kim & Stewart LLP

(57) ABSTRACT

According to an embodiment, a fixing device includes a cylindrical body that rotates about an axial direction and a heater that heats the cylindrical body. The heater includes a substrate with a length direction matching the axial direction. The substrate has a first portion with a width in a width direction that is greater than a width of a second portion in the width direction. A first heating element is on a central portion of the substrate overlapping with the second portion. A first temperature sensing element is at a position along the axial direction that does not overlap with the second portion.

8 Claims, 8 Drawing Sheets

FIXING DEVICE

CROSS-REFERENCE TO RELATED APPLICATION

This application is based upon and claims the benefit of priority from Japanese Patent Application No. 2022-076611, filed May 6, 2022, the entire contents of which are incorporated herein by reference.

FIELD

Embodiments described herein relate to a fixing device for image forming apparatus and the like.

BACKGROUND

Some image forming apparatuses such as printers in homes and offices are equipped with fixing devices. Some fixing devices include a fixing belt that contacts a sheet on which a toner image has been formed and a planar heater that heats the fixing belt. The fixing device includes a heater holder that supports the planar heater. The heater holder supports the planar heater such that a longitudinal direction of the planar heater is aligned with a direction orthogonal to the sheet conveying direction. There is a known configuration in which a temperature sensing element (e.g., a thermistor or the like) for controlling the temperature of the planar heater is placed in contact with a substrate of the planar heater. In some configurations, a member of high thermal conductivity, such as one formed of copper or graphite, is disposed between the temperature sensing element and the substrate.

In some configurations, the planar heater is in direct sliding contact with an inner peripheral surface of the fixing belt. In some such configurations, a metal protective member is interposed between the planar heater and the inner peripheral surface of the fixing belt. With any configuration, it is desirable that both long side edges of the planar heater are completely linear in the region corresponding to the entire width of the fixing belt in order to ensure uniform heat transfer to the fixing belt. In this context, the long side edges of the planar heater are on the upstream and downstream sides of the planar heater with respect to the sheet conveying direction (which corresponds to a rotation direction of the fixing belt), and the width of the fixing belt is a direction orthogonal to the sheet conveying direction (that is, an axial direction of the fixing belt).

However, for various reasons, the long side edges of the planar heater may not always be completely linear (in a straight line) within the range matching with the width of the fixing belt.

DETAILED DESCRIPTION

Figure 1:
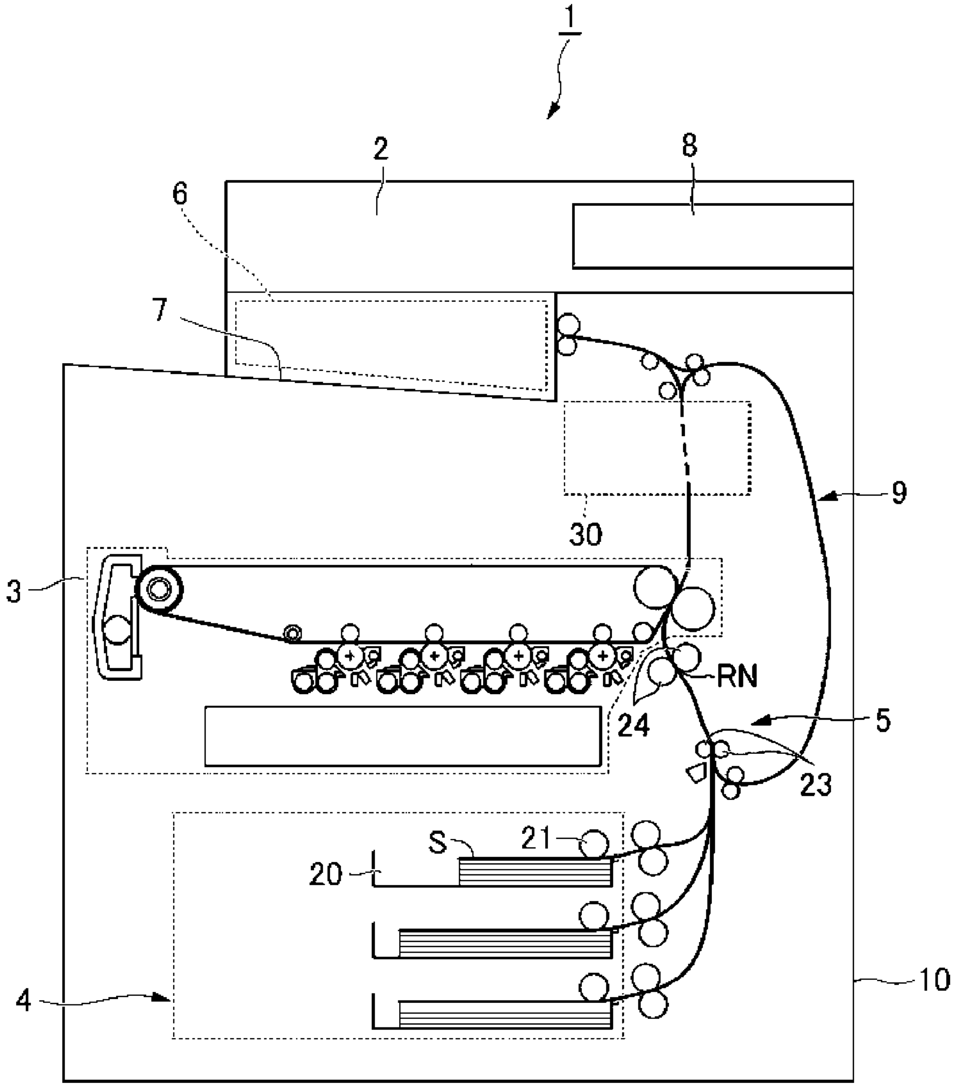
FIG. 1 is a view schematically illustrating a configuration of an image forming apparatus.

If long side edges of a planar heater cannot be formed in a straight line, a non-uniform temperature distribution may occur in the length direction of the planar heater near a position where the long side edges are not in a straight line. It may not be possible to perform appropriate temperature control of the fixing device with such a non-uniform temperature distribution. Example embodiments provide improved control of the fixing device temperatures by avoiding the influence of temperature non-uniformity.

In general, according to an embodiment, a fixing device includes a cylindrical body that rotates about an axial direction and a heater that heats the cylindrical body. The heater includes a substrate with a length direction matching the axial direction. The substrate has a first portion with a width in a width direction that is greater than a width of a second portion in the width direction. A first heating element is on a central portion of the substrate overlapping with the second portion. A first temperature sensing element is at a position along the axial direction that does not overlap with the second portion.

In general, according to one embodiment, a fixing device includes: a cylindrical body; a heater unit that heats the cylindrical body and includes a substrate whose longitudinal direction corresponds to an axial direction of the cylindrical body and that includes, within a range of a width of the cylindrical body in the axial direction, a first range in a first shape that is a shape of cross-section orthogonal to the axial direction and a second range in a second shape different from the first shape and being narrower than the first range in the axial direction, and a heating element supported by the substrate; and a temperature sensing element that measures a temperature of the cylindrical body at a position in the axial direction of the cylindrical body that avoids the second range.

According to one embodiment, a fixing device includes: a cylindrical body; a heater unit that heats the cylindrical body and includes a substrate whose longitudinal direction corresponds to an axial direction of the cylindrical body and that includes, within a range of a width of the cylindrical body in the axial direction, a first range in a first shape that is a shape of cross-section orthogonal to the axial direction and a second range in a second shape different from the first shape and being narrower than the first range in the axial direction, and a heating element supported by the substrate; and a temperature sensing element that measures a temperature of the heater unit at a position in the axial direction of the cylindrical body that avoids the second range.

According to one embodiment, a fixing device includes: a cylindrical body; a heater unit that heats the cylindrical body and includes a substrate whose longitudinal direction corresponds to an axial direction of the cylindrical body and that includes, within a range of a width of the cylindrical body in the axial direction, a first range in a first shape that is a shape of cross-section orthogonal to the axial direction and a second range in a second shape different from the first shape and being narrower than the first range in the axial direction, and a heating element supported by the substrate; a heat transfer member in contact with the heater unit; and a temperature sensing element that measures a temperature of the heat transfer member at a position in the axial direction of the cylindrical body that avoids the second range.

Hereinafter, certain example embodiments of a fixing device will be described with reference to the drawings. FIG. 1 is a view schematically illustrating a configuration of an image forming apparatus 1. An image forming apparatus 1 performs processing for forming an image on a sheet S. The sheet S may be a paper sheet. The image forming apparatus 1 includes a housing 10, a scanner unit 2, an image forming unit 3, a sheet feeding unit 4, a conveying unit 5, a reversing unit 9, a tray 7, a control panel 8, a control unit 6, and a fixing device 30.

The housing 10 forms an outer surface of the image forming apparatus 1. The scanner unit 2 reads image information of an object to be copied based on brightness and darkness of light and generates an image signal. The scanner unit 2 outputs the generated image signal to the image forming unit 3. The image forming unit 3 forms a toner image corresponding to the image signal from the scanner unit 2 or otherwise from an external device. The toner image is an image formed with toner or other similar material. The image forming unit 3 transfers the toner image to a surface of the sheet S. The image forming unit 3 heats and presses the toner image on the surface of the sheet S to fix the toner image onto the sheet S.

The sheet feeding unit 4 feeds the sheets S one by one to the conveying unit 5 in accordance with the timing at which the image forming unit 3 forms the toner image. The sheet feeding unit 4 has a sheet storage unit 20 and a pickup roller 21. The sheet storage unit 20 stores sheets S of a predetermined size and type. The pickup roller 21 picks up the sheets S one by one from the sheet storage unit 20. The pickup roller 21 feeds the picked sheet S to the conveying unit 5.

The conveying unit 5 conveys the sheet S from the sheet feeding unit 4 to the image forming unit 3. The conveying unit 5 includes a conveying roller 23 and a registration roller 24. The conveying roller 23 conveys the sheet S fed by the pickup roller 21 to the registration roller 24. The conveying roller 23 causes the tip end (leading edge) of the sheet S in a conveying direction to abut against a nip RN of the registration roller 24. The registration roller 24 adjusts a position of the tip end of the sheet S by bending the sheet S at the nip RN. The registration roller 24 conveys the sheet S according to a timing set to match the timing at which the image forming unit 3 can transfer the toner image to the sheet S.

Figure 2:
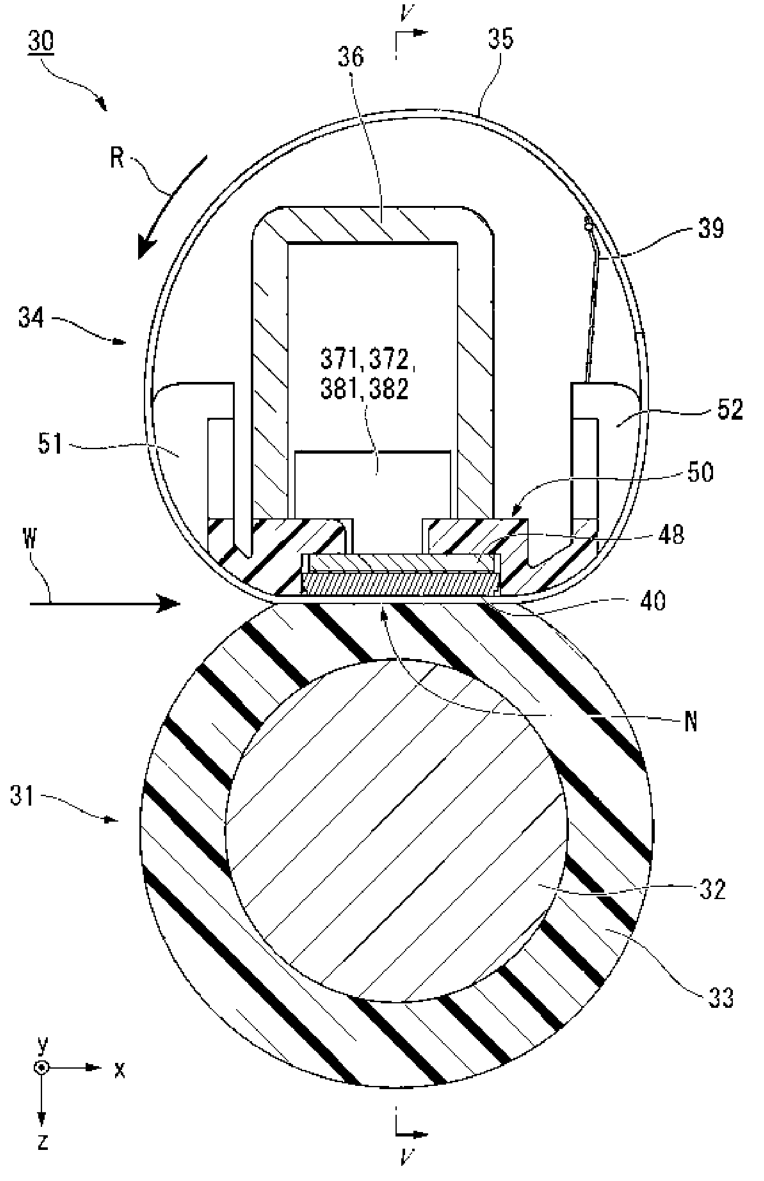
FIG. 2 is a cross-sectional view of a fixing device according to a first embodiment when viewed from a +y direction.

FIG. 2 is a cross-sectional view of a fixing device 30. The fixing device 30 has a pressure roller 31 and a heating roller 34. The nip N is formed between the pressure roller 31 and the heating roller 34. A z direction, x direction and y direction are defined herein as follows. The z direction is a thickness direction of a planar heater 40 and a direction in which the heating roller 34 and the pressure roller 31 are aligned. In the z direction, a direction from the heating roller 34 toward the pressure roller 31 is defined as a positive direction. The x direction is a lateral direction of the planar heater 40 and the conveying direction of the sheet S through the nip N. In the x direction, a downstream in the conveying direction of the sheet S is defined as the positive direction. The y direction is a longitudinal direction of the planar heater 40 and an axial direction of a fixing belt 35 of the heating roller 34.

The pressure roller 31 presses the toner image onto the sheet S at the nip N. The pressure roller 31 includes a core metal 32 and an elastic layer 33. The core metal 32 is formed of a metal material such as stainless steel or the like in a columnar (bar) shape. The elastic layer 33 is formed of an elastic material such as silicone rubber or the like. The elastic layer 33 has a constant thickness on an outer peripheral surface of the core metal 32. A release layer formed of a resin material, such as tetrafluoroethylene-perfluoroalkyl vinyl ether copolymer (PFA) or the like, may be provided on an outer peripheral surface of the elastic layer 33.

The pressure roller 31 is driven by a motor to rotate. When the pressure roller 31 rotates with the nip N formed, the fixing belt 35 of the heating roller 34 is also driven to rotate. The pressure roller 31 rotates with a sheet S in the nip N, and thus the sheet S is conveyed in a conveying direction W.

The heating roller 34 heats the toner image on the sheet S at the nip N. The heating roller 34 includes the fixing belt 35, the planar heater 40, a heat transfer member 48, a holder 50, a frame 36, and temperature sensing elements 371, 372, 381, 382, 391, 392, and 393.

The fixing belt 35 is cylindrical. The fixing belt 35 includes a base layer, an elastic layer, and a release layer in this order from an inner peripheral side. The base layer is formed of a resin material such as polyimide (PI) or the like to reduce heat capacity. The elastic layer is formed of an elastic material such as silicone rubber or the like. The release layer is formed of a material such as PFA resin or the like.

Figure 3:
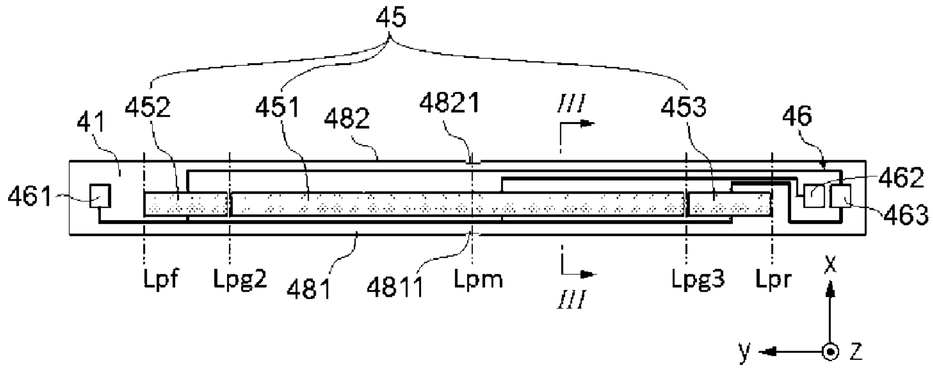
FIG. 3 is a view illustrating a planar heater when viewed from a +z direction.
Figure 4:
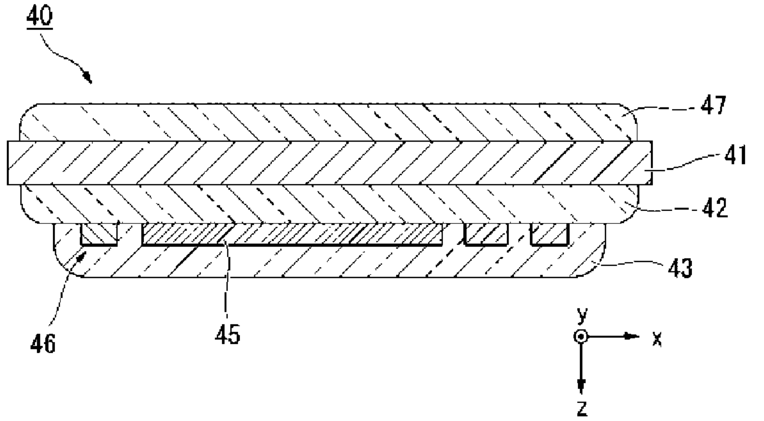
FIG. 4 is a cross-sectional view of a planar heater taken along line III-III in FIG. 3.

The planar heater 40 is positioned inside the fixing belt 35 (that is, within the region surrounded by the fixing belt 35). A surface of the planar heater 40 in a +z direction contacts the inner surface of the fixing belt 35 via grease. FIG. 3 is a view illustrating the planar heater 40 when viewed from the +z direction. FIG. 4 is a cross-sectional view of the planar heater 40 taken along line III-III in FIG. 3. The planar heater 40 has a substrate 41, a heating element 45, and wiring 46.

The substrate 41 can be formed of a metal material such as stainless steel or the like, a ceramic material such as aluminum nitride or the like. As illustrated in FIG. 3, the substrate 41 has a shape of an elongated rectangular plate. A longitudinal direction (lengthwise direction) of the substrate 41 matches an axial direction of the fixing belt 35. As illustrated in FIG. 4, an insulating layer 42 is formed of a glass material or the like on a surface of the substrate 41 in the +z direction. An insulating layer 47 is formed on a surface of the substrate 41 in a −z direction.

The heating element 45 can be formed of silver-palladium alloy or the like. When energized, the heating element 45 generates heat. The heating element 45 is connected to the wiring 46. The wiring 46 includes a common electrode 461, a central electrode 462, and an end electrode 463. The heating element 45 and the wiring 46 are arranged on the surface of the substrate 41 in the +z direction on the insulating layer 42. A protective layer 43 is formed of a glass material or the like so as to cover portions of the wiring 46 (excluding the common electrode 461, the central electrode 462 and the end electrode 463) and the heating element 45.

As illustrated in FIG. 3, the heating element 45 includes a central heating element 451 and a pair of end heating elements 452 and 453. The end heating element 452 is on a +y side of the central heating element 451. The end heating element 453 is on a −y side of the central heating element 451. Heat generation of the central heating element 451 and the pair of end heating elements 452 and 453 is controlled independently of each other. Heat generation of the end heating elements 452 and 453 is mutually or pair controlled (that is, the heating elements 452 and 453 are energized or turned off in the same manner as one another). The central heating element 451 is connected between the common electrode 461 and the central electrode 462 to generate heat. The pair of end heating elements 452 and 453 are connected between the common electrode 461 and the end electrode 463 to generate heat.

The heat transfer member 48 illustrated in FIG. 2 is formed of a material with high thermal conductivity such as metal such as copper or the like or graphite or the like. An planar shape of the heat transfer member 48 matches that of the substrate 41 of the planar heater 40. The heat transfer member 48 contacts the surface of the planar heater 40 in the −z direction.

The holder 50 is formed of a resin material such as a liquid crystal polymer or the like. The holder 50 covers both x-direction sides of the planar heater 40 and a portion of the −z-direction surface thereof. The holder 50 supports the planar heater 40 from the −z direction side of the planar heater 40 via the heat transfer member 48. The holder 50 supports an inner peripheral surface of the fixing belt 35 at both x-direction edges of the planar heater 40.

The holder 50 has upstream ribs 51 and downstream ribs 52. The upstream ribs 51 extend upstream in a rotation direction of the fixing belt 35. The downstream ribs 52 extend downstream in the rotation direction of the fixing belt 35. The upstream ribs 51 and the downstream ribs 52 can come into contact with the inner surface of the fixing belt 35. The upstream ribs 51 and the downstream ribs 52 act to hold the fixing belt 35 in a predetermined shape. The upstream ribs 51 and the downstream ribs 52 have a plate shape in which the y direction is a thickness direction. A plurality of upstream ribs 51 and a plurality of downstream ribs 52 are arranged in the y direction. The upstream ribs 51 and the downstream ribs 52 may be disposed at different positions in the y direction. As a result, the temperature unevenness in the fixing device 30 can be prevented.

The frame 36 can be formed of a steel plate material or the like. The frame 36 is positioned inside the fixing belt 35 (that is, within the region surrounded by the fixing belt 35). The frame 36 is mounted on a surface of the holder 50 in the −z direction. The frame 36 extends in the y direction. Both ends of the frame 36 in the y direction are fixed to the housing 10 of the image forming apparatus 1 or the like. The frame 36 supports the planar heater 40 via the holder 50 and the heat transfer member 48.

The temperature sensing elements 371 and 372 are thermistors, for example. The temperature sensing elements 381 and 382 are thermostats, for example. The temperature sensing elements 391, 392, and 393 are thermistors, for example. The temperature sensing elements 371 and 372 are positioned on the −z side of the planar heater 40 with the heat transfer member 48 interposed therebetween. The temperature sensing elements 371 and 372 measure the temperature of the planar heater 40 as passed through the heat transfer member 48. The temperature sensing elements 381 and 382 cut off the energization of the heating element 45 if the temperature of the planar heater 40 (as measured at the heat transfer member 48) exceeds a predetermined temperature. The temperature sensing elements 391, 392, and 393 contact the inner peripheral surface of the fixing belt 35 to measure the temperature of the fixing belt 35. A coating layer may be disposed on a surface of the heat transfer member 48 in the −z direction or an electrically insulating sheet such as polyimide or the like may be disposed on the heat transfer member 48 in order to provide electrical insulation between the heat transfer member 48 and the temperature sensing elements 371, 372, 381, and 382. In the present embodiment, the electrically insulating material on the surface of the heat transfer member 48 can be considered as an integral part of the heat transfer member 48.

A long side 481 on a −x side of the substrate 41 is almost straight except for one location where there is a recess 4811 which deviates in the +x direction from the rest of the long side 481. A long side 482 on a +x side of the substrate 41 is almost straight except for one location where there is a recess 4821 which deviates in the −x direction from the rest of the long side 482. The recesses 4811 and 4821 are at the same position along the y direction. The recesses 4811 and 4821 overlap in position with the central heating element 451.

For example, the recesses 4811 and 4821 might be provided for contacting a tool or element such as a clip, a strap, or the like which may be used for fixing, holding, or manipulating the planar heater 40 during the manufacturing process of the planar heater 40. For example, the presence of the recesses 4811 and 4822 may permit the bringing of a tool into contact with the planar heater 40 for more stably and reliably holding the planar heater 40 in position. The rest of the long sides 481 and 482 of the substrate 41 other than the recesses 4811 and 4821 are kept from damage. In some cases, the recesses 4811 and 4821 are provided to receive a tool that is inserted between separate substrates 41 arranged side by side so as to increase the clearance between substrates 41 in the manufacturing process of the substrates 41 or otherwise. In some examples, the recesses 4811 and 4821 may be places where "runners" can be set when the substrate 41 is manufactured by a casting or injection molding. The recesses 4811 and 4821 may be provided for preventing so-called burrs that remain after the runner separation from protruding. The recesses 4811 and 4821 can be provided for preventing burrs that may occur when the substrate 41 is manufactured by press working, from protruding. As described above, due to circumstances in the manufacturing process, the long sides 481 and 482 of the substrate 41 of the planar heater 40 might not formed in an entirely straight line, even within a range corresponding to the width of the fixing belt 35. That is, there may be recesses 4811 and 4821 provided thereon respectively as a result of the manufacturing process, an artifact of the manufacturing process, and/or as an aid in the manufacturing process.

Figure 5:
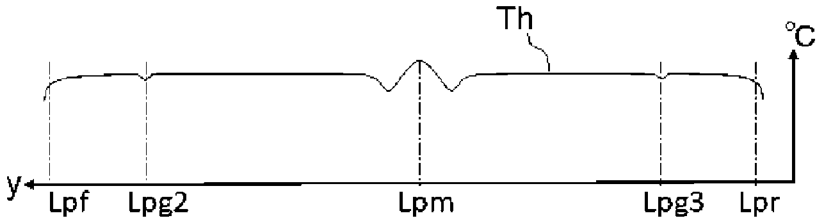
FIG. 5 shows a temperature distribution when the planar heater generates heat.

FIG. 5 illustrates a temperature distribution along the y direction when a planar heater 40 having recesses 4811 and 4821 is energized to generate heat. A position Lpf at an end of the end heating element 452 on the +y side, a position Lpg2 between the end heating element 452 and the central heating element 451, a position Lpm at a midpoint of the recesses 4811 and 4821 overlapping with the central heating element 451, a position Lpg3 between the end heating element 453 and the central heating element 451, and a position Lpr at an end of the end heating element 453 on the −y side in FIG. 3 correspond to positions with the same reference numerals in FIG. 5, respectively. At the position Lpf on the +y side and the position Lpr on the −y side, the temperature decreases toward the outside. A decrease in temperature also occurs at positions between heating elements. Furthermore, since the recesses 4811 and 4821 are provided in this example at the position Lpm (where the cross-sectional area of an X-Z cross section of the substrate 41 decreases) the temperature decreases in the vicinity of the end of the recesses 4811 and 4821 in the y direction, and conversely, the temperature increases at the midpoint of the recesses 4811 and 4821 in the y direction.

Figure 6:
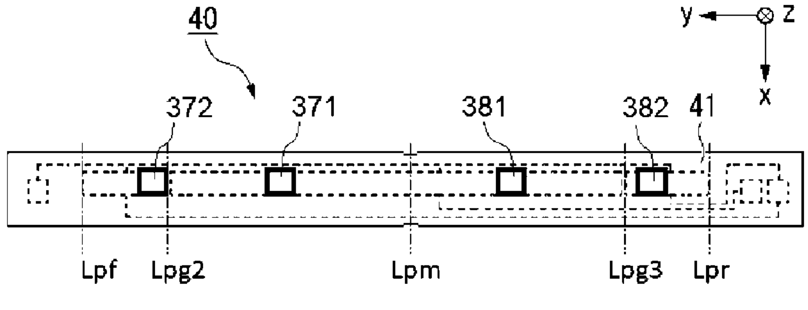
FIG. 6 is a view illustrating a planar heater when viewed from a −z direction.

FIG. 6 is a view illustrating the planar heater 40 when viewed from the −z direction. The temperature sensing elements 371, 372, 381, and 382 are provided at positions near the positions Lpg2, Lpg3, Lpm while avoiding portions where the temperature is locally increased or decreased when each of the central heating element 451 and the end heating elements 452 and 453 are energized to generate heat. Specifically, the temperature sensing element 371 contacts the heat transfer member 48 at a position overlapping the central heating element 451 but nearer the end heating element 452 than the midpoint position along the y direction. The temperature sensing element 372 contacts the heat transfer member 48 at overlapping the end heating element 452 but towards an end of the end heating element 452 closer to the central heating element 451. The temperature sensing element 381 contacts the heat transfer member 48 at a position overlapping the central heating element 451 but nearer the end heating element 453 than the midpoint position along the y direction. The temperature sensing element 382 contacts the heat transfer member 48 at a position overlapping the end heating elements 453 but towards an end of the end heating element 453 closer to the central heating element 451.

Since the temperature sensing elements 371, 372, 381, and 382 are provided at positions avoiding the position Lpm, that is, the midpoint between the recesses 4811 and 4821 along the y direction, it is possible to prevent the temperature sensing elements 371, 372, 381, and 382 from being influenced by temperature non-uniformity at that location caused by the changes in the cross-sectional area of the X-Z cross section of the substrate 41. Furthermore, since the temperature sensing elements 371, 372, 381, and 382 also avoid the positions of the recesses 4811 and 4821, it is possible to prevent the temperature sensing elements 371, 372, 381, 382 from being influenced temperature non-uniformities caused by the changes in the cross-sectional area of the X-Z cross section of the substrate 41.

Figure 7:
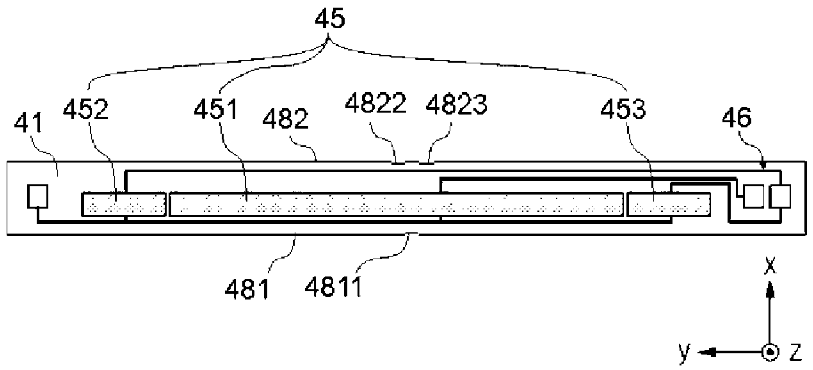
FIG. 7 is a view illustrating a variation of recesses on long sides of a substrate.

The positions and shapes recess(es) on the long sides of the substrate 41 have many variations. For example, as illustrated in FIG. 7, a recess 4822 may be positioned on the long side 482 on the +x side of the substrate 41 at a position shifted from the recess 4811 in the y direction with respect to the recess 4811 on the long side 481 on the −x side of the substrate 41. The recesses 4811 and 4822 are positioned to overlap with the central heating element 451 in the y direction. In addition, a plurality of recesses such as recesses 4822 and 4823 may be positioned on the long side 482 on the +x side of the substrate 41 at positions shifted from the recess 4811 in the y direction with respect to the recesses 4811 on the long side 481 on the −x side of the substrate 41. The recess 4811 and the recesses 4822 and 4823 are positioned to overlap with the central heating element 451 in the y direction.

Figure 8:
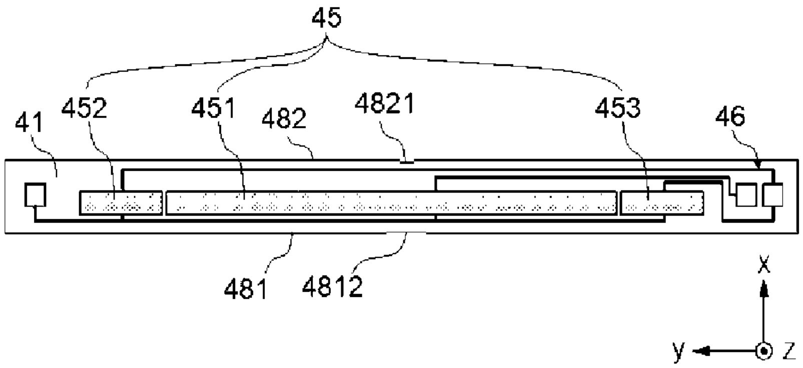
FIG. 8 is a view illustrating a variation of recesses on long sides of a substrate.

For example, as illustrated in FIG. 8, a recess 4812 longer in the y direction than the recess 4821 may be positioned on the long side 481 on the −x side of the substrate 41 at a position overlapping with the recess 4821 in the y direction with respect to the recess 4821 on the long side 482 on the +x side of the substrate 41. The recesses 4812 and 4821 are positioned to overlap with the central heating element 451 in the y direction.

Figure 9:
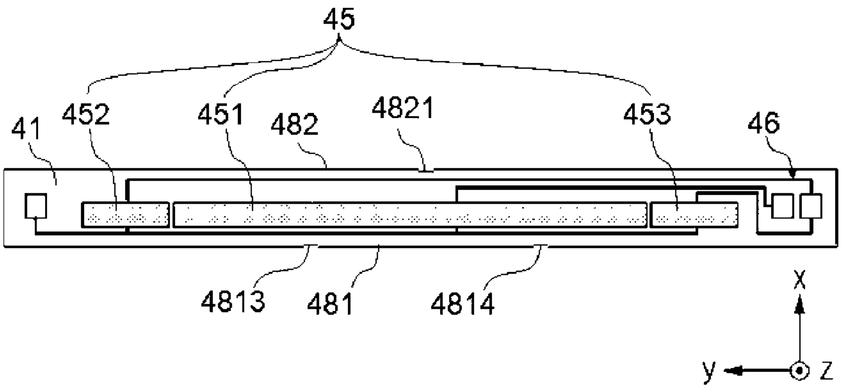
FIG. 9 is a view illustrating a variation of recesses on long sides of a substrate.

For example, as illustrated in FIG. 9, a recess 4813 may be positioned on the long side 481 on the −x side of the substrate 41 at a position shifted from the recess 4821 in the y direction with respect to the recess 4821 on the long side 482 on the +x side of the substrate 41. The recesses 4821 and 4813 are positioned to overlap with the central heating element 451 in the y direction. In addition, a plurality of recesses such as recesses 4813 and 4814 may be positioned on the long side 481 on the −x side of the substrate 41 at positions shifted from the recess 4821 in the y direction with respect to the recesses 4821 on the long side 482 on the +x side of the substrate 41. The recess 4821 and the recesses 4813 and 4814 are positioned to overlap with the central heating element 451 in the y direction.

Figure 10:
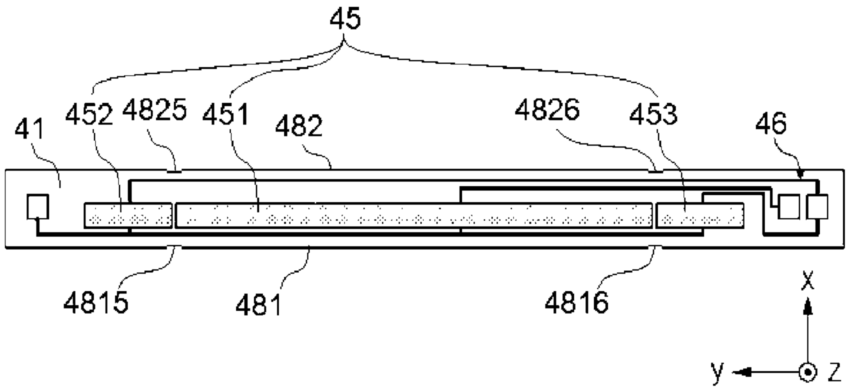
FIG. 10 is a view illustrating a variation of recesses on long sides of the substrate.

For example, as illustrated in FIG. 10, a recess 4815 on the long side 481 on the −x side of the substrate 41 and a recess 4825 on the long side 482 on the +x side of the substrate 41 are positioned at the same position in the y direction, and also overlap with the position between the end heating element 452 and the central heating element 451. In addition, a recess 4816 on the long side 481 on the −x side of the substrate 41 and a recess 4826 on the long side 482 on the +x side of the substrate 41 are positioned at the same position in the y direction, and also overlap with the position between the end heating element 453 and the central heating element 451.

Figure 11:
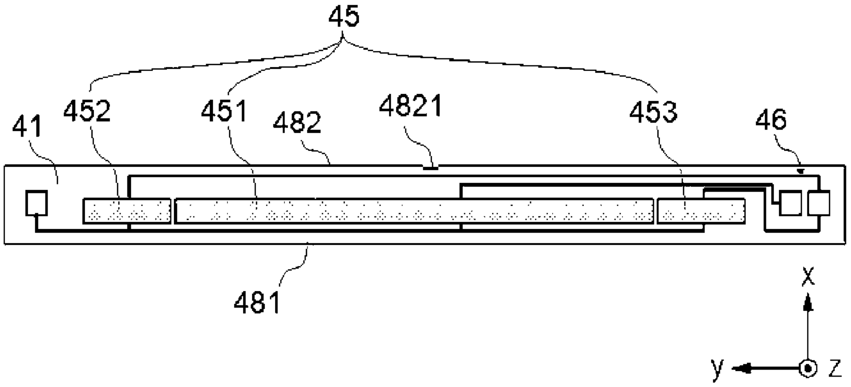
FIG. 11 is a view illustrating a variation of recesses on long sides of a substrate.

For example, as illustrated in FIG. 11, while the long side 482 on the +x side of the substrate 41 has the recess 4822, the long side 481 on the −x side of the substrate 41 may not have a recess. It is understood that shape interchanges in the +x side and the −x side of FIGS. 7 to 11, and the presence or absence and number of recesses on the long side of the substrate 41 are not limited to the variations described above. Further, the reason the recess is provided on the long sides of the substrate 41 is not limited to convenience in the manufacturing process. For example, there is a case in which a recess for receiving an engaging portion for preventing the planar heater 40 from moving in the y direction with respect to the holder 50 is provided on the long side of the substrate 41.

Regardless of the shape, as long as the temperature sensing element is provided at a position avoiding the recess position along the y direction, it is possible to prevent the temperature sensing element from being influenced by the change in the cross-sectional area of the X-Z cross section of the substrate 41. Note that even when a projection instead of the recess is provided on the long side of the substrate 41, there still is a risk that a temperature non-uniformity occurs at a position where there is the projection. As long as the temperature sensing element avoids the position of the projection along the y direction, it is possible to prevent the temperature sensing element from being influenced by the change in the cross-sectional area of the X-Z cross section of the substrate 41.

Figure 12:
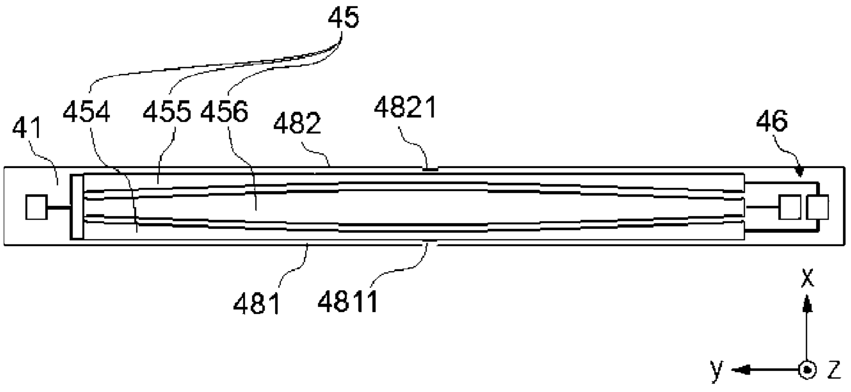
FIG. 12 is a view illustrating a variation of a planar heater.

Further, the heating element 45 is not limited to an arrangement with a central heating element 451 and a pair of end heating elements 452 and 453. For example, as illustrated in FIG. 12, an intermediate auxiliary heating element 456 may be provided between an upstream heating element 454 and a downstream heating element 455. The heat generation of the upstream heating element 454 and the downstream heating element 455 may be mutually controlled in the same manner, and the heat generation of the intermediate auxiliary heating element 456 may be controlled independently of the upstream heating element 454 and the downstream heating element 455.

Figure 13:
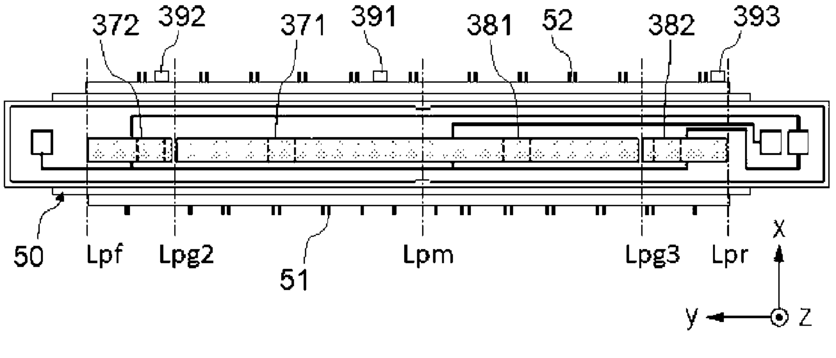
FIG. 13 is a view illustrating a planar heater fitted in a holder when viewed from the +z direction.

FIG. 13 is a view illustrating the planar heater 40 fitted in the holder 50 when viewed from the +z direction. The temperature sensing elements 391, 392, and 393 are provided at positions near the positions Lpg2, Lpg3, Lpm but avoid positions in the +x direction (downstream in the rotation direction of the fixing belt 35) where the temperature is not uniformly distributed, and the temperature is locally increased or decreased when each of the central heating element 451, and the end heating elements 452 and 453 is energized to generate heat. Specifically, the temperature sensing element 391 contacts the fixing belt 35 at a position overlapping the central heating element 451 and towards the downstream direction (in the rotation direction) of the fixing belt 35. The temperature sensing element 392 contacts the fixing belt 35 at a position overlapping the end heating element 452 but nearer the central heating element 451 and downstream in the rotation direction of the fixing belt 35. The temperature sensing element 393 contacts the fixing belt 35 at a position overlapping the end heating elements 453 but away from the central heating element 45, and downstream in the rotation direction of the fixing belt 35.

Since the temperature sensing elements 391, 392, and 393 are provided at positions avoiding the position Lpm, that is, the midpoint of the recesses 4811 and 4821 along the y direction, it is possible to prevent the temperature sensing elements 391, 392, and 393 from being influenced by the change in the cross-sectional area of the X-Z cross section of the substrate 41. Furthermore, since the temperature sensing elements 391, 392, and 393 are provided at positions avoiding overlap with the recesses 4811 and 4821, it is possible to prevent the temperature sensing elements 391, 392 and 393 from being influenced by the change in the cross-sectional area of the X-Z cross section of the substrate 41.

As described above, by providing all the temperature sensing elements at positions avoiding the position Lpm, that is, the midpoint of the recesses 4811 and 4821 in the y direction, it is possible to prevent the temperature sensing elements from being influenced by temperature non-uniformity caused by the change(s) in the cross-sectional area of the X-Z cross section of the substrate 41, and thereby appropriately control the fixing device. Furthermore, by providing the temperature sensing elements at positions avoiding overlap with the recesses 4811 and 4821, it is possible to prevent the temperature sensing elements from being influenced by the change in the cross-sectional area of the X-Z cross section of the substrate 41, and thereby appropriately control the fixing device.

In addition, a thermostat instead of (or in addition to) a thermistor may be provided as a temperature sensing element at positions that avoid the position Lpm. For a temperature sensing element such as a thermostat that only serves as a so-called safety device by which the temperature sensing element itself cuts off power when a certain temperature is exceeded, the thermosensitive element may be provided at the position Lpm when maximum device temperature is a primary concern rather than temperature uniformity or the like. A temperature sensing element such as a thermistor or the like that serves as a thermometer for controlling the amount of energization supplied to the planar heater 40 is preferably provided at positions avoiding the position Lpm.

Figure 14:
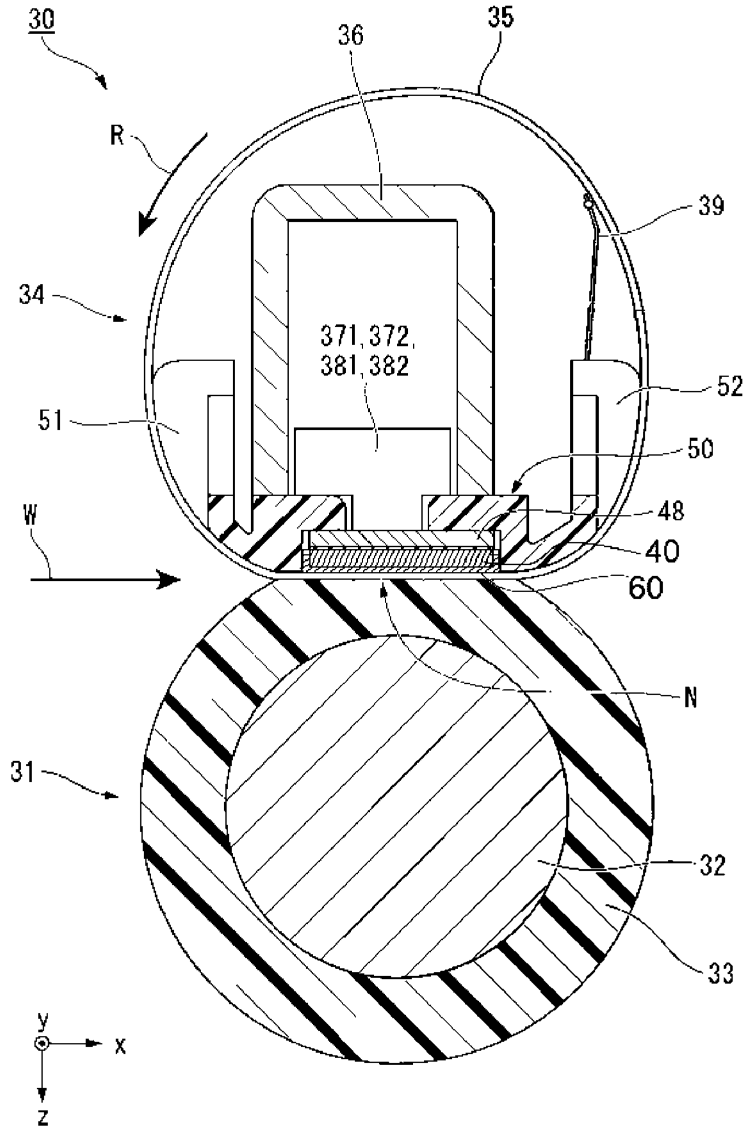
FIG. 14 is a cross-sectional view of a fixing device according to a second embodiment.

FIG. 14 is a cross-sectional view of a fixing device 30 according to a second embodiment. The same reference numerals are assigned to the same configurations as those of the first embodiment, and the description thereof will be omitted. The fixing device 30 according to the second embodiment includes a cover 60 between the planar heater 40 and the fixing belt 35. The surface of the planar heater 40 in the −z direction is in contact with the surface of the cover 60 in the +z direction, and the surface of the cover 60 in the +z direction is in sliding contact with the inner surface of the fixing belt 35. The cover 60 covers the entire heating element 45 in the y direction. The cover 60 preferably covers the planar heater 40 from the outside of the end of the fixing belt 35 in the +y direction to the outside of the end of the fixing belt 35 in the −y direction. The cover 60 is formed of a metal material such as stainless steel and the like.

The non-uniformity in the temperature distribution of the planar heater 40 in the y direction when the planar heater 40 is energized to generate heat can be alleviated by the heat diffusion inside the cover 60 before being transmitted to the fixing belt 35. Since temperature non-uniformity is overall reduced by inclusion of cover 60, the expected benefits obtained by providing the temperature sensing elements 391, 392, and 393 at positions avoiding the position Lpm may be relatively reduced as compared to the first embodiment. However, improved results are still to be expected relative to existing art.

Figure 15:
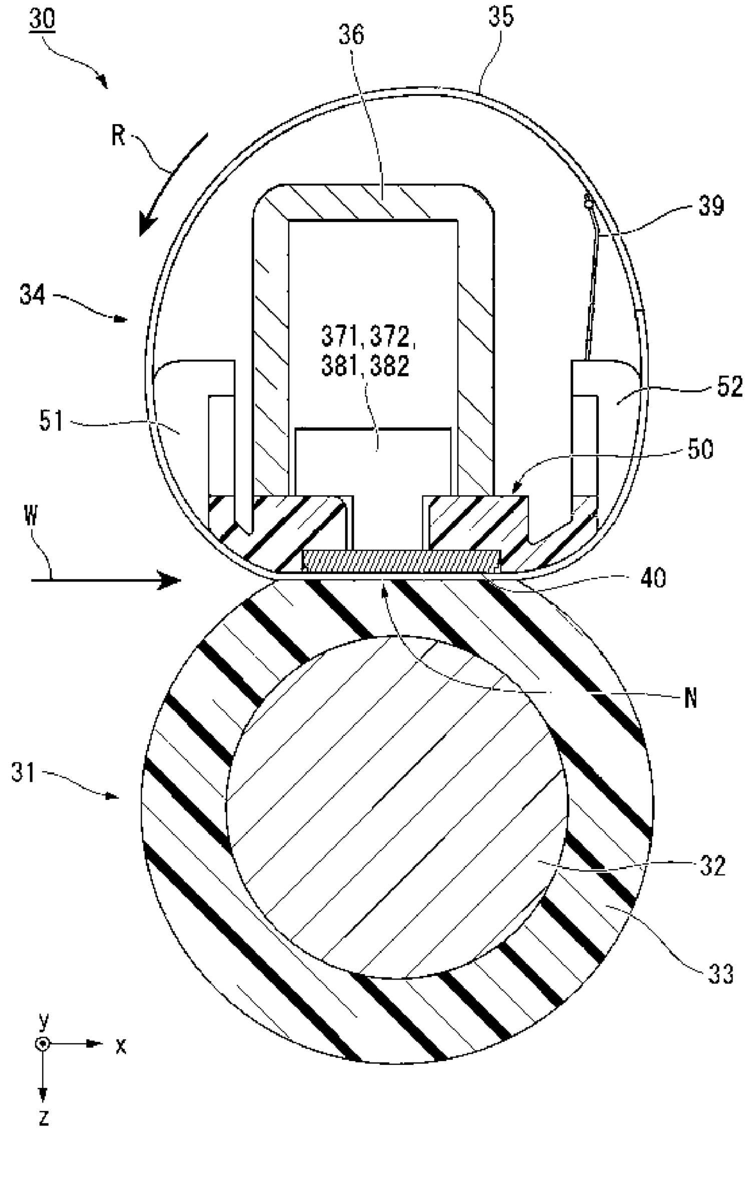
FIG. 15 is a cross-sectional view of a fixing device according to a third embodiment.

FIG. 15 is a cross-sectional view of a fixing device 30 according to a third embodiment. The same reference numerals are assigned to the same configurations as those of the first embodiment, and the description thereof will be omitted. The fixing device 30 according to the third embodiment does not include the heat transfer member 48 interposed between the planar heater 40 and the holder 50. The temperature sensing elements 371, 372, 381, and 382 are in contact with the surface of the planar heater 40 in the −z direction. In the first embodiment, the non-uniformity in the temperature distribution of the planar heater 40 in the y direction when the planar heater 40 is energized to generate heat is mitigated by heat diffusion inside the heat transfer member 48 before being transmitted to the temperature sensing elements 371, 372, 381, and 382, but in the configuration of the third embodiment (where there is no heat transfer member 48), the non-uniformity in the temperature distribution of the planar heater 40 is not mitigated and thus benefits associated with positioning of the temperature sensing elements 371, 372, 381, and 382 to avoid the position Lpm and the like are increased.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A fixing device, comprising:
- a fixing belt configured to rotate about an axial direction;
- a heater within an interior region surrounded by the fixing belt, the heater configured to heat the fixing belt and including:
  - a substrate with a length direction corresponding to the axial direction, the substrate having different widths in a width direction perpendicular to the length direction such that a first portion has a width in the width direction that is greater than a width of a second portion in the width direction, a first heating element on a central portion of a frontside of the substrate to overlap with the second portion, and a second heating element on an end portion of the frontside of the substrate to overlap with the first portion;

a first temperature sensing element on a backside of the substrate at a position along the axial direction that overlaps with the first heating element but not the second portion; and a second temperature sensing element at a position on the backside of the substrate along the axial direction that overlaps with the second heating element and not the first heating element.

2. The fixing device according to claim 1, wherein the position of the first temperature sensing element along the axial direction is offset from a midpoint of the substrate along the length direction.

3. The fixing device according to claim 1, wherein the heater further includes a third heating element on another end portion of the frontside of the substrate, and the first heating element is between the second and third heating elements in the length direction.

4. The fixing device according to claim 3, further comprising:

a third temperature sensing element on the backside of the substrate at a position overlapping the third heating element.

5. The fixing device according to claim 1, wherein the second temperature sensing element overlaps an end of the second heating element nearest the first heating element but not an end of the second heating element farthest from the first heating element.

6. The fixing device according to claim 1, wherein the frontside of the substrate is nearest an inner peripheral surface of the fixing belt.

7. The fixing device according to claim 1, further comprising:

a heat transfer member between the heater and the first temperature sensing element.

8. The fixing device according to claim 1, wherein the second portion is at a midpoint of the substrate along the length direction.

* * * * *